Patented Apr. 17, 1951

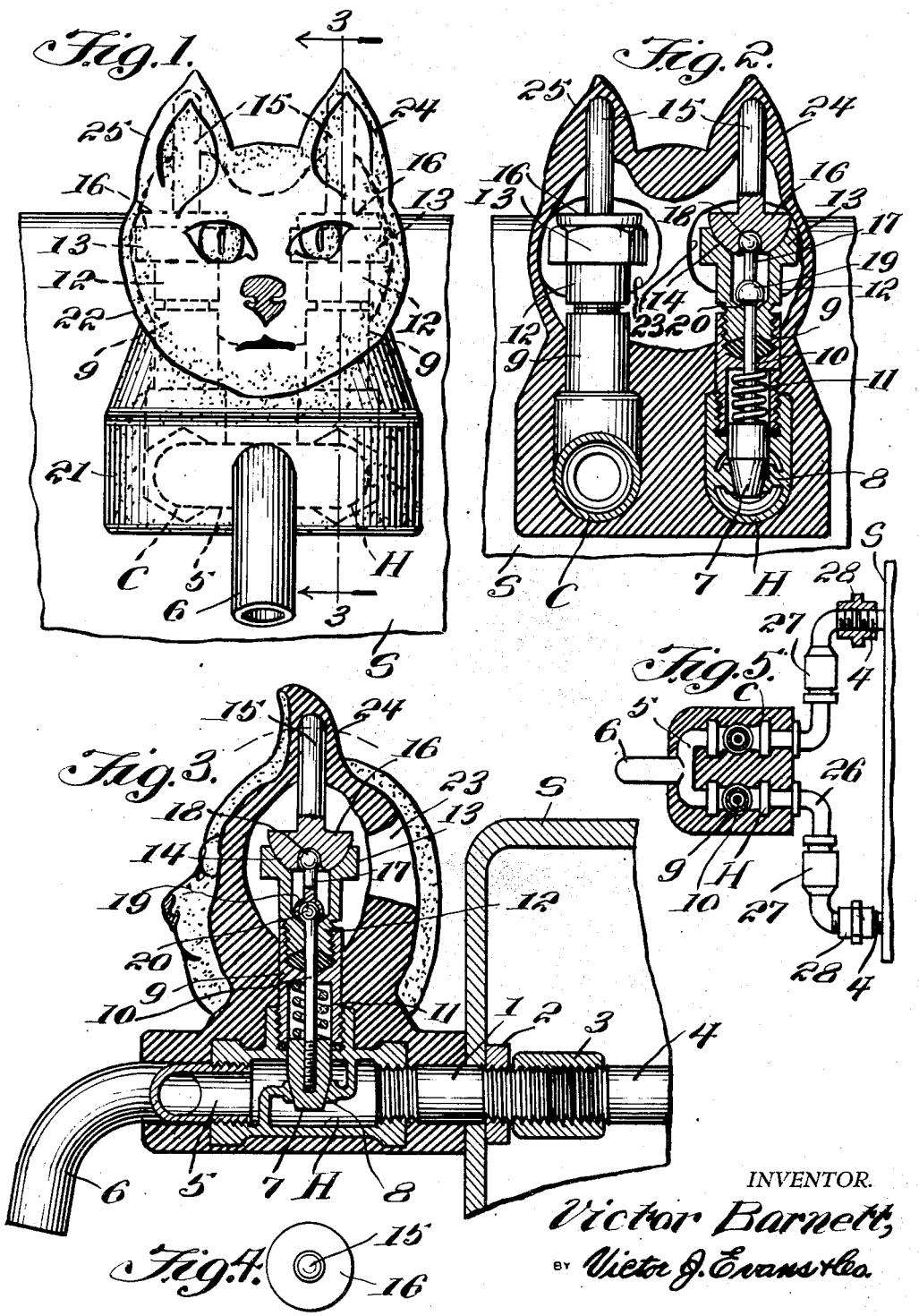

2,548,933

UNITED STATES PATENT OFFICE 2,548,933

WATER FAUCET

Victor Barnett, Evansville, Ind.

Application July 20, 1948, Serial No. 39,675

1 Claim. (Cl. 277—60)

The present invention relates to the general class of water faucets and especially to combination hot and cold water faucets for domestic use in the kitchen, bath room, lavatories and other desirable places. The primary purpose of the invention is the provision of a compactly arranged exterior casing that encloses the faucet, while not interfering with the customary operations of the faucet in controlling the flow of water. In the preferred form of the invention the enclosing casing is molded or otherwise fixed upon a combination hot and cold water faucet to simulate the head of an animal, and the ears of the animal's head are utilized for jointly and or for separately manipulating the valve levers of the faucet. The casing enclosing the faucet, thus provides a novel, ornamental, and useful element, and the fixture thus equipped is designed to attract the attention especially of children, and others.

The equipment for the faucet includes a minimum number of parts that may with facility be manufactured with low cost of production, and the casing may with convenience be installed on the faucet, to provide a durable and reliable covering therefor.

The invention consists in certain novel features of construction and combinations and arrangements of parts as will hereinafter be described, and more particularly set forth in the appended claim.

In the accompanying drawings I have illustrated a complete example of a physical embodiment of my invention wherein the parts are combined and arranged in accord with one mode I have devised for the practical application of the principles of my invention. It will however be understood that changes and alterations are contemplated and may be made in these exemplifying drawings and mechanical structures, within the scope of my claim, without departing from the principles of the invention.

Figure 1 is a front view in elevation of a faucet with which my invention is embodied.

Figure 2 is a vertical sectional view through the hot and cold water valves of the faucet.

Figure 3 is a vertical sectional view at line 3—3 of Fig. 1.

Figure 4 is a face view of one of the valve levers; and

Figure 5 is a horizontal sectional view, on a reduced scale, showing a modified arrangement of coupling the faucet to supply pipes.

In this preferred form of the invention, the faucet is equipped with two similar valve casings, as H for hot water and C for cold water, that are each provided with an inlet pipe 1, nut 2 and coupling 3 to the supply pipe 4, and these pipes are mounted as usual in a suitable support as S forming part of the plumbing equipment of the faucet.

The valve-casings are provided with an outlet for water that includes a U-bend 5 and an integral nozzle or spout 6 for the joint flow and mingling of hot and cold water, or for the flow of either hot or cold water singly.

Inasmuch as the valve arrangements are similar, a description of one will suffice for both of them. As here shown the faucet is equipped with vertically reciprocating and tapered plug valve 7, adapted to control the flow of water through a ported seat 8, and the valve reciprocates in a sleeve 9.

The valve is equipped with an upwardly extending stem 10, and a spring 11 resiliently holds it to its seat, while the stem projects upwardly through a hollow screw plug 12 that is fashioned with a hexagonal head 13 formed with a central bore that terminates in an upper concave or hemispherical seat 14. An upstanding valve lever 15 is fashioned with a complementary hemi-spherical head 16 that is resiliently held by spring 11 in its seat 14, by means of a toggle connection made between the valve lever and the valve stem consisting of a link 17 having a head in a socket of the lever head and a ball and socket joint 19 and 20 with the valve stem.

For convenience of illustration, and as here shown, the enclosing casing for the faucet simulates the head of a cat which, may be applied to or molded about the dual valve devices of the faucet, leaving the nozzle 6, preferably, uncovered.

The exterior casing or cover may be fashioned of suitable material having varying degrees of density, as for instance a composite material, or the casing may be made of hard rubber having resilient or elastic parts as will be described.

The exterior casing includes a base 21 that encloses the valve casings, and an upper portion or body 22 having a rear orifice or opening 23 that will permit the use of a tool or wrench in adjusting the enclosed parts. The body 22 of the casing, which forms the face and head of a cat, as here shown, is fashioned with two upstanding hollow knobs or handles 24 and 25 that fit snugly on the two valve levers 15, 15, and these integral knobs that form the ears of the animal are fashioned of resilient or elastic rubber. Thus, it will be apparent the hot and cold water valves, either jointly or singly, may be manipulated by pushing or pulling the respective ears of the cat, the hemispherical head being rocked on its seat thus reciprocating the valve stem, the valve-plugs attached thereto controlling the flow of water to the nozzle or spout of the faucet.

In Fig. 5 a modified arrangement of the plumbing equipment is shown for connecting two spaced supply pipes 4, 4, which includes inlet elbows 26 to the valve casings, a pair of elbow couplings 27, and a pair of union joints 28; and these fixtures readily adapt the faucet for attachment to the spaced supply pipes.

Having thus fully described my invention, what I claim as new and desire to secure by Letters Patent is:

In a hot and cold water faucet adapted to be respectively connected to hot and cold water supply pipes and having a common discharge nozzle the improvement comprising a valve for each supply pipe having a stem thereon, a ball on the upper end of the stem, a link having a ball on one end and a socket on the other end thereof adapted to engage the ball on the stem, a pivoted upstanding valve control lever having a semi-spherical head thereon provided with a socket for engaging the ball on the link, a semi-spherical socket in said faucet to receive the semi-spherical head on said lever, and reciprocation of said link being provided by the rocking movement of the semi-spherical head in the correspondingly shaped socket in the faucet for controlling the operation of the valve and the discharge of water from each supply pipe, a casing of resilient material on said faucet completely enclosing said faucet except for said nozzle and an elastic bendable portion for each lever integral with the casing and enclosing the upper end portions of each lever so that the lateral deformation of each bendable portion will control the respective lever for the discharge of water from said faucet.

VICTOR BARNETT.

REFERENCES CITED

The following references are of record in the file of this patent:

UNITED STATES PATENTS

| Number | Name | Date |
|---|---|---|
| 937,570 | Davis | Oct. 19, 1909 |
| 1,196,520 | Chadwick | Aug. 29, 1916 |
| 1,285,978 | Gauger | Nov. 26, 1918 |
| 1,335,946 | Watrous | Apr. 6, 1920 |
| 1,540,400 | Kellan | June 2, 1925 |
| 1,627,020 | Dougherty | May 3, 1927 |
| 1,755,643 | Gapp | Apr. 22, 1930 |
| 1,928,461 | Pelouch | Sept. 26, 1933 |
| 2,034,420 | Reiland | Mar. 17, 1936 |
| 2,372,081 | Haldane | Mar. 20, 1945 |
| 2,375,215 | Davis | May 8, 1945 |

FOREIGN PATENTS

| Number | Country | Date |
|---|---|---|
| 555,716 | Great Britain | of 1943 |